(12) United States Patent
Suzuki

(10) Patent No.: US 9,267,543 B2
(45) Date of Patent: Feb. 23, 2016

(54) CAGE UNIT AND TAPERED ROLLER BEARING EQUIPPED WITH CAGE UNIT

(71) Applicant: JTEKT CORPORATION, Osaka-shi, Osaka (JP)

(72) Inventor: Akiyuki Suzuki, Nagoya (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

(21) Appl. No.: 14/657,202

(22) Filed: Mar. 13, 2015

(65) Prior Publication Data
US 2015/0275974 A1 Oct. 1, 2015

(30) Foreign Application Priority Data
Mar. 25, 2014 (JP) ................. 2014-062295

(51) Int. Cl.
*F16C 33/66* (2006.01)
*F16C 19/36* (2006.01)

(52) U.S. Cl.
CPC .......... *F16C 33/6681* (2013.01); *F16C 19/364* (2013.01); *F16C 33/6651* (2013.01)

(58) Field of Classification Search
CPC .... F16C 19/364; F16C 33/366; F16C 33/383; F16C 33/6651; F16C 33/6681; F16C 43/605
USPC ................ 384/462, 470, 523, 548, 560, 565, 384/571–572
See application file for complete search history.

(56) References Cited

U.S. PATENT DOCUMENTS

| | | | | |
|---|---|---|---|---|
| 2,219,031 A * | 10/1940 | Frauenthal | .......... | F16C 33/6681 384/572 |
| 3,539,231 A * | 11/1970 | Langstrom | .......... | F16C 33/3806 384/470 |
| 4,192,560 A * | 3/1980 | Hartnett | .......... | F16C 19/30 384/572 |
| 4,629,339 A * | 12/1986 | Morinaga | .......... | F16C 23/086 384/576 |
| 6,206,575 B1 * | 3/2001 | Matsushita | .......... | F16C 19/163 384/470 |
| 6,533,462 B2 * | 3/2003 | Kawakami | .......... | F16C 33/414 384/470 |
| 7,507,028 B2 * | 3/2009 | Markle | .......... | F16C 33/3875 384/470 |
| 2008/0069488 A1 * | 3/2008 | Ueno | .......... | F16C 19/163 384/470 |
| 2009/0060407 A1 * | 3/2009 | Tachi | .......... | F16C 33/3806 384/533 |
| 2010/0111459 A1 * | 5/2010 | Yasuda | .......... | F03D 11/0008 384/548 |
| 2013/0051717 A1 * | 2/2013 | Duffy | .......... | F16C 33/6681 384/470 |

FOREIGN PATENT DOCUMENTS

JP 2007-032612 A 2/2007

* cited by examiner

*Primary Examiner* — Marcus Charles
(74) *Attorney, Agent, or Firm* — Oliff PLC

(57) ABSTRACT

Provided is a cage unit including a cage having a small diameter side annular portion, a large diameter side annular portion arranged so as to be spaced apart in an axial direction from the small diameter side annular portion, and a plurality of cage bar portions that connect the small diameter side annular portion and the large diameter side annular portion; and a tapered roller accommodated in a pocket, which is a space surrounded by the small diameter side annular portion, the large diameter side annular portion, and the cage bar portions. A lubrication groove lying along a circumferential direction is formed on an inner end face of the large diameter side annular portion that faces a roller large end face of the tapered roller, and a circumferential length of the lubrication groove is designed such that the lubrication groove overlaps the roller large end face in the circumferential direction.

8 Claims, 5 Drawing Sheets

CAGE UNIT AND TAPERED ROLLER BEARING EQUIPPED WITH CAGE UNIT

INCORPORATION BY REFERENCE

The disclosure of Japanese Patent Application No. 2014-062295 filed on Mar. 25, 2014 including the specification, drawings and abstract is incorporated herein by reference in its entirety.

BACKGROUND OF THE INVENTION

1. Field of the Invention

The invention relates to a cage unit and a tapered roller bearing equipped with the cage unit. More specifically, the invention relates to a cage unit including a lubrication groove for accommodating lubricating oil, and a tapered roller bearing equipped with the cage unit.

2. Description of Related Art

A tapered roller bearing has been conventionally used to configure a rotation supporting unit of various types of mechanical devices. In such tapered roller bearing, a sliding portion exists between an end face of a tapered roller and a rib end face of an inner ring or an outer ring. A contacting state of both end faces in the sliding portion is a rolling contact that involves sliding. Thus, when the lubricating oil to be supplied to the bearing runs short or runs dry, seizure easily occurs at the end faces.

During the operation of the mechanical device, the lubricating oil is scattered and supplied to the bearing due to the stirring of the lubricating oil, and the like involved in the rotation of a shaft. If the mechanical device is once stopped but immediately re-started, the lubricating oil remaining on both end faces can maintain a lubricating effect, and hence the seizure does not occur.

However, if the mechanical device is once stopped and re-started after a considerable time has elapsed, the lubricating oil attached to both end faces flows down by gravity, and the lubricating oil runs short or runs dry. Thus, the seizure easily occurs.

Forming a groove for oil sump in a cage itself, which holds a plurality of tapered rollers at predetermined intervals along a circumferential direction, has been proposed (see e.g., Japanese Patent Application Publication No. 2007-32612 (JP 2007-32612 A)). FIG. 4A is a partial perspective view of a cage 20 in a roller bearing described in JP 2007-32612 A. FIG. 4B is a partial plan view of the same. In the cage 20 described in JP 2007-32612 A, a circumferential groove 23 that lies along a circumferential direction is formed on an inner end face 21a, which faces a pocket 22, of a large diameter end 21 of the cage 20. The seizure is assumed to be prevented since the shortage of the lubricating oil at the time of an initial operation after a long idle period is alleviated by the lubricating oil accommodated in the circumferential groove 23. In FIGS. 4A and 4B, a reference number 24 denotes a cage bar portion that connects a small diameter end 25 and the large diameter end 21 of the cage 20.

As shown in FIG. 5, the circumferential groove 23 in the roller bearing described in JP 2007-32612 A is formed over the entire inner end face 21a facing the pocket. Thus, portions 23a in the vicinity of both ends of the circumferential groove 23 do not face the end face of the tapered roller 26 and are in an opened state. If an operation stopped state is continued for a long period of time, therefore, the lubricating oil flows out, though only gradually, from the portions 23a in the vicinity of both ends of the circumferential groove 23, whereby the lubricating oil may run short or run dry and the seizure may occur at the time of re-start.

SUMMARY OF THE INVENTION

One of the objects of the present invention is to provide a cage unit that can supply the lubricating oil even at the time of the initial operation after a long idle period and that can enhance a seizure resistance, and a tapered roller bearing equipped with the cage unit.

According to an aspect of the present invention, a cage unit includes a cage having a small diameter side annular portion, a large diameter side annular portion arranged so as to be spaced apart in an axial direction from the small diameter side annular portion, and a plurality of cage bar portions that connect the small diameter side annular portion and the large diameter side annular portion; and a tapered roller accommodated in a pocket, which is a space surrounded by the small diameter side annular portion, the large diameter side annular portion, and the cage bar portions. In the cage unit, a lubrication groove lying along a circumferential direction is formed on an inner end face of the large diameter side annular portion that faces a roller large end face of the tapered roller, and a circumferential length of the lubrication groove is designed such that the lubrication groove overlaps the roller large end face of the tapered roller in the circumferential direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
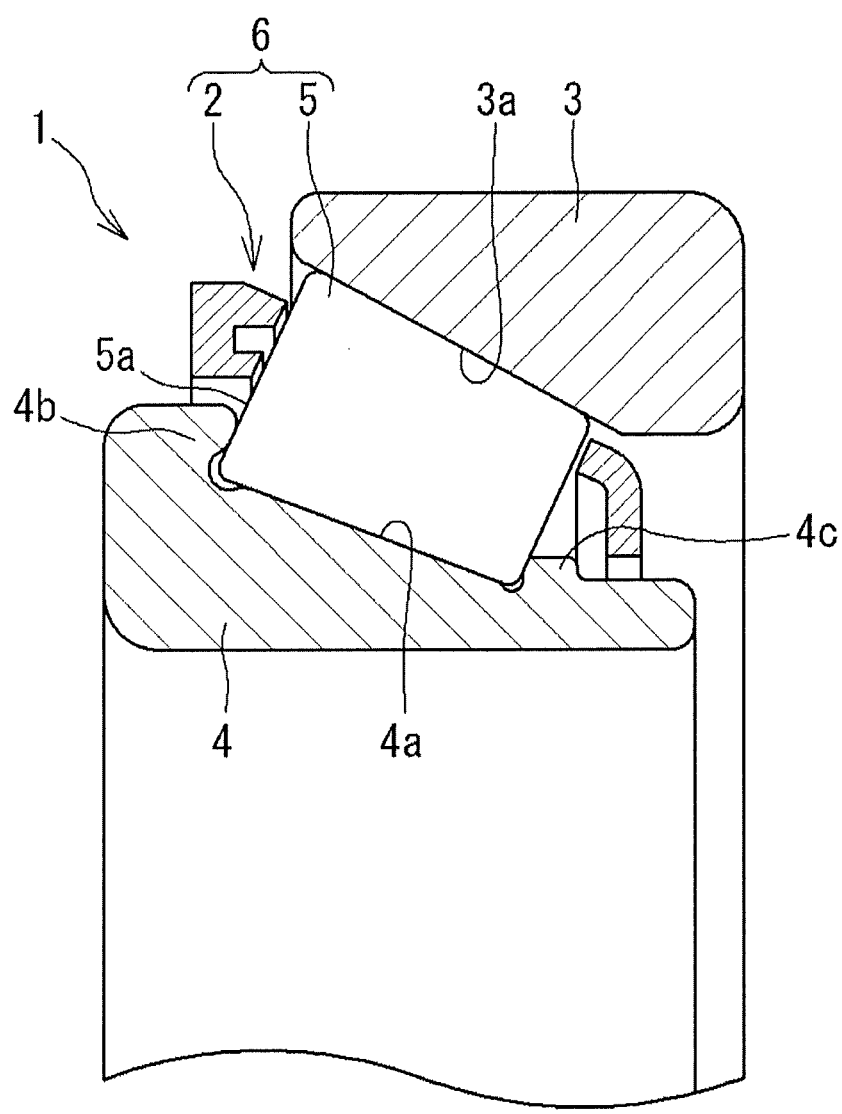
FIG. 1 is a cross-sectional explanatory view of one embodiment of a tapered roller bearing of the present invention.
Figure 2:
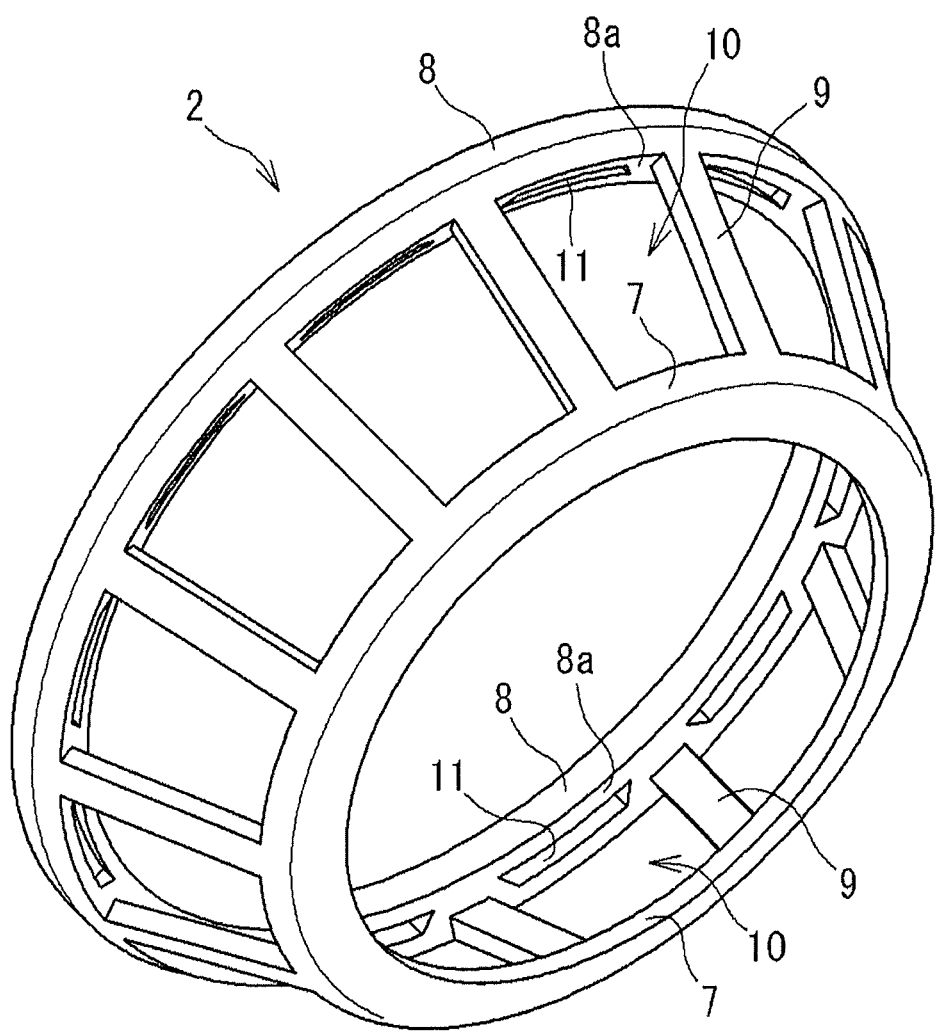
FIG. 2 is a perspective explanatory view of a cage in the tapered roller bearing shown in FIG. 1.

An embodiment of a cage unit and a tapered roller bearing equipped with the cage unit according to the present invention will be hereinafter described in detail with reference to the accompanying drawings. FIG. 1 is a cross-sectional explanatory view of a tapered roller bearing 1 according to one embodiment of the present invention. FIG. 2 is a perspective explanatory view of a cage 2 in the tapered roller bearing 1 shown in FIG. 1.

The tapered roller bearing 1 according to the present embodiment includes an outer ring 3, an inner ring 4, a plurality of tapered rollers 5, and the cage 2. The outer ring 3 has a conical raceway surface 3a on an inner circumferential side. The inner ring 4 has a conical raceway surface 4a, which faces the raceway surface 3a, on an outer circumferential side. The tapered rollers 5 are arranged in an annular space between the raceway surface 3a and the raceway surface 4a. The cage 2 holds the tapered rollers 5 at predetermined intervals along the circumferential direction. The cage 2 and the tapered rollers 5 configure a cage unit 6. The inner ring 4 is arranged radially inwardly of the outer ring 3 so as to be relatively rotatable with respect to the outer ring 3. A cone back face rib portion (hereinafter, referred to as a large rib portion) 4b is formed on a large diameter side of the raceway surface 4a of the inner ring 4, and a cone front face rib portion (hereinafter, referred to as a small rib portion) 4c is formed on a small diameter side of the raceway surface 4a.

The cage 2 includes a small diameter side annular portion 7, a large diameter side annular portion 8, and a plurality of cage bar portions 9. The large diameter side annular portion 8 is arranged so as to be spaced apart in an axial direction from the small diameter side annular portion 7. The cage bar portions 9 connect the annular portions. As shown in FIG. 2, the cage 2 has a circular truncated cone shape as a whole, where a plurality of pockets 10 are formed at equal intervals along the circumferential direction between the cage bar portions 9 adjacent to each other. The tapered roller 5 is held in the pocket 10 in a freely rotating manner. The cage 2 can be produced from a synthetic resin that excels in oil resistance such as PPS containing glass fiber for example, but may also be produced from an iron-based metal.

Figure 3:
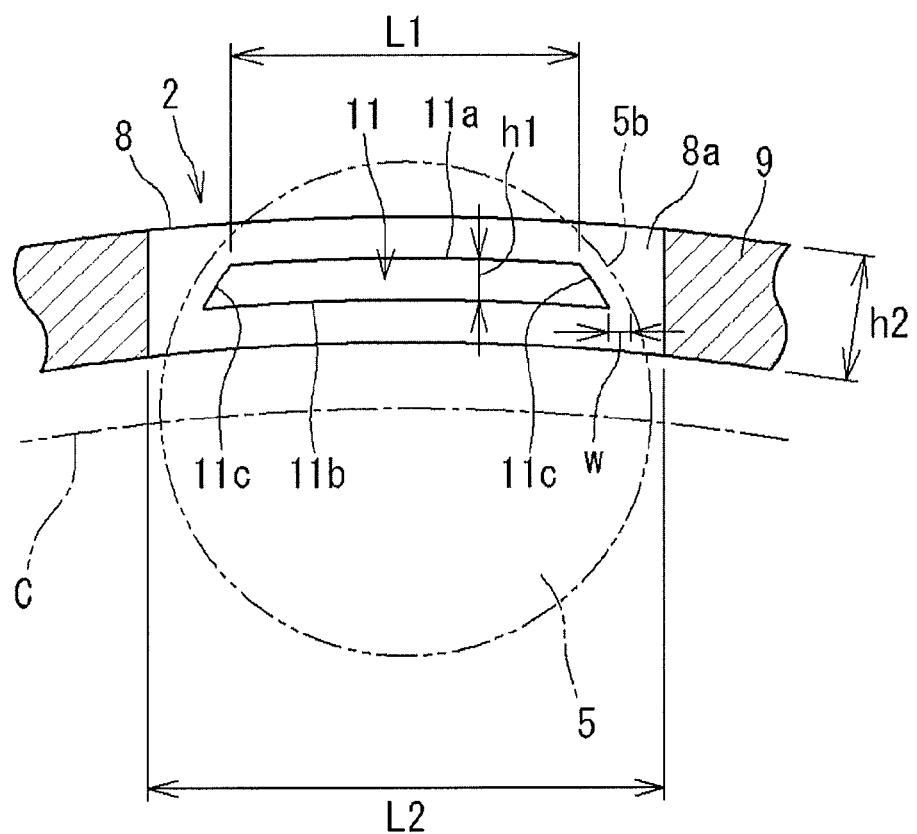
FIG. 3 is a side surface explanatory view of the cage shown in FIG. 2.
Figure 4A:
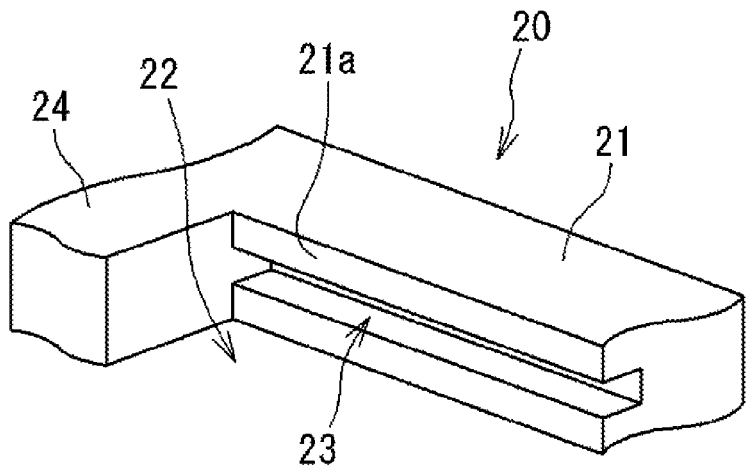
FIG. 4A is a partial perspective view of a cage of a related art.
Figure 4B:
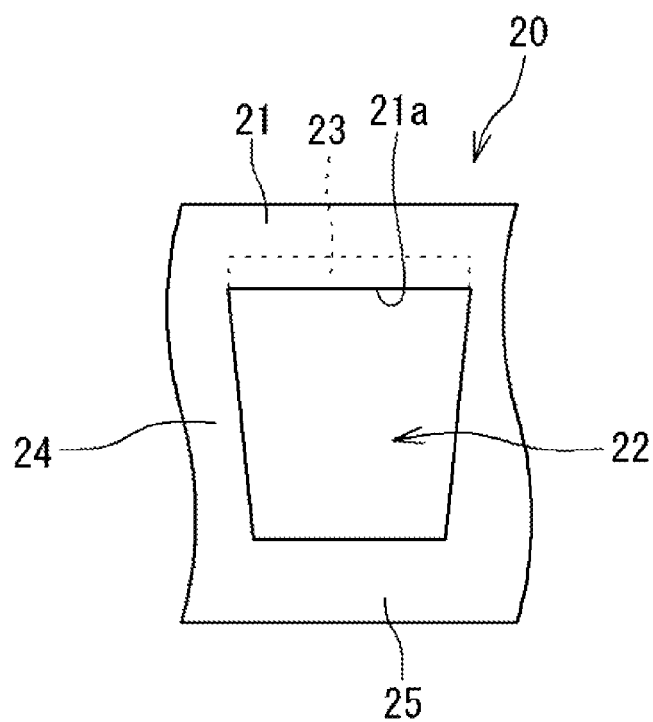
FIG. 4B is a partial plan view of the same.
Figure 5:
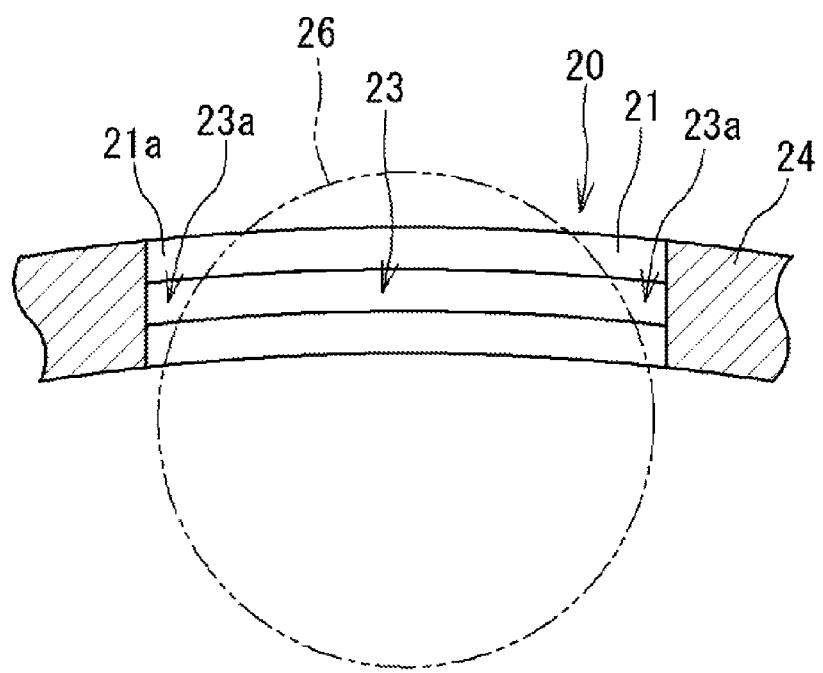
FIG. 5 is a side surface explanatory view of the cage of the related art.

A lubrication groove 11 that lies along the circumferential direction is formed on an inner end face 8a of the large diameter side annular portion 8 of the cage 2. The inner end face 8a of the large diameter side annular portion 8 is the end face that faces a roller large end face 5a of the tapered roller 5 so as to be contactable therewith. As shown in FIG. 3, a circumferential length of the lubrication groove 11 is designed such that the lubrication groove 11 overlaps the roller large end face 5a of the tapered roller 5 in the circumferential direction e.g. as shown the lubrication groove is opposite the roller large end face over the entire length of the lubrication groove so that it can be covered by end face 5a. Thus, when the device equipped with the tapered roller bearing 1 is stopped, an opening of the lubrication groove 11 is brought into contact with the roller large end face 5a of the tapered roller 5 as if being covered by the roller large end face 5a. In other words, the lubricating oil is held between the roller large end face 5a of the tapered roller 5 and the cage 2 by a surface tension of the lubricating oil. Therefore, even if the device is re-started after a long idle period, the lubricating oil accommodated in the lubrication groove 11 will not flow out. As a result, the seizure at the time of the re-start that occurs from the shortage or the depletion of the lubricating oil can be prevented.

As shown in FIG. 3, the lubrication groove 11 in the present embodiment is positioned on a radially outer side (upper side in FIG. 3) of a pitch circle C of the roller large end face 5a of the tapered roller 5. The lubrication groove 11 has a short side 11a extending in a circumferential direction, a long side 11b, and coupling sides 11c. The long side 11b is positioned on the radially inner side of the short side 11a, and has a longer circumferential length than the short side 11a. The coupling sides 11c connect the ends of the short side 11a and the long side 11b. The opening of the lubrication groove 11 surrounded by the short side 11a, the long side 11b, and the coupling sides 11c has a substantially trapezoidal shape. The coupling side 11c is a curved line (circular arc) substantially parallel to an edge 5b, that is, a circular edge of the roller large end face 5a of the tapered roller 5. Thus, a minimum thickness can be made thick and molding can be made advantageous, and furthermore, the capacity of the lubrication groove 11 can be increased.

In the present embodiment, a circumferential length w between the coupling side 11c and the edge of the roller large end face 5a of the tapered roller 5 is set to be longer than a relatively movable distance in the circumferential direction of the tapered roller 5 and the pocket 10. Therefore, even if the tapered roller 5 is stopped and deviated to either side in the circumferential direction in the pocket 10, the opening of the lubrication groove 11 can be reliably covered by the roller large end face 5a of the tapered roller 5. Thus, the lubricating oil can be reliably prevented from flowing out from the lubrication groove 11. The circumferential length w between the coupling side 11c and the edge of the roller large end face 5a of the tapered roller 5 is not particularly limited in the present invention, and may be about 0.5 mm, for example.

The lubrication groove 11 is arranged at substantially the middle of the inner end face 8a of the large diameter side annular portion 8 in each of the height direction (up and down direction in FIG. 3) and the circumferential direction. A height h1 of the lubrication groove 11 is about a third of a height h2 of the inner end face 8a. A length L1 of the short side 11a of the lubrication groove 11 along the circumferential direction is about two thirds of a length L2 of the inner end face 8a along the circumferential direction. The size and depth of the opening of the lubrication groove 11 are not particularly limited in the present invention, and may be appropriately selected within a range so that a predetermined strength is ensured in view of the material, the size, and the like of the cage 2.

The embodiment disclosed herein is to be considered in all aspects as merely illustrative and not restrictive. The scope of the invention is defined by the appended claims rather than by the foregoing detailed description of the embodiment.

For example, the shape of the opening of the lubrication groove is a substantially trapezoidal shape in the embodiment described above, but may be other shapes such as an oval shape, and a band plate shape. Furthermore, the coupling sides that connect the short side and the long side of the lubrication groove are curved lines in the embodiment described above, but may be straight lines.

According to the cage unit and the tapered roller bearing equipped with the cage unit of the present invention, the lubricating oil can be supplied even at the time of the initial operation after a long idle period, and the seizure resistance can be enhanced.

What is claimed is:

1. A cage unit comprising:
   a cage including a small diameter side annular portion, a large diameter side annular portion arranged so as to be spaced apart in an axial direction from the small diameter side annular portion, and a plurality of cage bar portions that connect the small diameter side annular portion and the large diameter side annular portion; and
   a tapered roller accommodated in a pocket, which is a space surrounded by the small diameter side annular portion, the large diameter side annular portion, and the cage bar portions; wherein
   a lubrication groove lying along a circumferential direction is formed on an inner end face of the large diameter side annular portion that faces a roller large end face of the tapered roller so as to be contactable therewith, and a circumferential length of the lubrication groove is designed such that the lubrication groove is covered by the roller large end face of the tapered roller in the circumferential direction when brought into contact with the roller large end face,
   the lubrication groove is positioned on a radially outer side of a pitch circle of the roller large end face of the tapered roller, the lubrication groove includes a short side extending in the circumferential direction, a long side positioned on a radially inner side of the short side and having a longer circumferential length than the short side, and a coupling side that connects ends of the short side and the long side, and an opening of the lubrication groove has a substantially trapezoidal shape, and a circumferential length between the coupling side and an edge of the roller large end face of the tapered roller is longer than a relatively movable distance in the circumferential direction of the tapered roller and the pocket.

2. The cage unit according to claim 1, wherein the coupling side is a curved line substantially parallel to the edge of the roller large end face of the tapered roller.

3. A tapered roller bearing comprising:
an outer ring;
an inner ring arranged radially inwardly of the outer ring so as to be relatively rotatable with respect to the outer ring; and
the cage unit according to claim 2 arranged in an annular space between the outer ring and the inner ring.

4. The cage unit according to claim 1, wherein the coupling side is a straight line.

5. A tapered roller bearing comprising:
an outer ring;
an inner ring arranged radially inwardly of the outer ring so as to be relatively rotatable with respect to the outer ring; and
the cage unit according to claim 4 arranged in an annular space between the outer ring and the inner ring.

6. A tapered roller bearing comprising:
an outer ring;
an inner ring arranged radially inwardly of the outer ring so as to be relatively rotatable with respect to the outer ring; and the cage unit according to claim 1 arranged in an annular space between the outer ring and the inner ring.

7. A cage unit comprising:
a cage including a small diameter side annular portion, a large diameter side annular portion arranged so as to be spaced apart in an axial direction from the small diameter side annular portion, and a plurality of cage bar portions that connect the small diameter side annular portion and the large diameter side annular portion; and
a tapered roller accommodated in a pocket, which is a space surrounded by the small diameter side annular portion, the large diameter side annular portion, and the cage bar portions; wherein
a lubrication groove lying along a circumferential direction is formed on an inner end face of the large diameter side annular portion that faces a roller large end face of the tapered roller so as to be contactable therewith, and a circumferential length of the lubrication groove is designed such that the lubrication groove is opposite the roller large end face of the tapered roller over the entire length of the lubrication groove and is covered when brought into contact with the roller large end face to retain lubricating oil accommodated in the lubrication groove.

8. A tapered roller bearing comprising:
an outer ring;
an inner ring arranged radially inwardly of the outer ring so as to be relatively rotatable with respect to the outer ring; and
the cage unit according to claim 7 arranged in an annular space between the outer ring and the inner ring.

* * * * *